Jan. 31, 1967  L. C. LYNNWORTH ET AL  3,302,044
ULTRASONIC PROBE

Filed May 14, 1964  2 Sheets-Sheet 1

INVENTORS
LAWRENCE C. LYNNWORTH
EDMUND H. CARNEVALE
BY
Weingarten, Ouenbuch & Lahive
ATTORNEYS

United States Patent Office

3,302,044
Patented Jan. 31, 1967

3,302,044
ULTRASONIC PROBE
Lawrence C. Lynnworth, Waltham, and Edmund H. Carnevale, Beverly, Mass., assignors to Parametrics, Inc., Waltham, Mass., a corporation of Massachusetts
Filed May 14, 1964, Ser. No. 367,320
9 Claims. (Cl. 310—8.3)

This invention relates in general to ultrasonic wave transmitters and more particularly to an ultrasonic transmitting probe suitable for generating, transmitting and receiving both shear and longitudinal ultrasonic waves, Rayleigh or surface waves, and also certain plate waves similar to Lamb waves.

The transmission and measurement of ultrasonic waves have become increasingly useful in a variety of fields, such as non-destructive material testing and ultrasonic delay line measurement. With respect to non-destructive testing, ultrasonic measurements on a material can yield information on several qualities of the material since the transmission of ultrasonic waves depends upon several characteristics of the material. Among these characteristics are the temperature of the material, the grain size, the moduli of elasticity and the continuity of the material itself, i.e., the presence of voids or flaws. Accordingly, measurement of the transmission characteristics of the ultrasonic waves through the material provides an indication of these characteristics. Depending upon the exact quality being measured, either the transmission of longitudinal waves, shear waves or both may be of interest.

It has been the practice when the waves of interest are shear waves to either utilize mode conversion at a surface of the test material to convert generated longitudinal waves into shear waves or else to generate the shear waves in the probe and physically bond the crystal or shear wave probe to the material to be tested. The bonding of the probe or shear wave generating crystal to the test material is impractical, however, when the test material is in process and when shear wave transmission tests are to be made at a relatively high repetition rate on a process flow line. There are some characteristics of a material, as suggested above, which require the measurement of both the shear and longitudinal wave transmission through the material. Typically, in order to determine Young's modulus of elasticity in a material, a measurement of the velocity of both shear and longitudinal waves must be made. The expression for Young's dynamic modulus of elasticity is given by:

$$E = \varphi V_L^2 (1+\sigma)(1-2\sigma)/(1-\sigma)$$

where $\varphi$ is the density of the material and Poisson's ratio is $$\sigma = \frac{1 - 2(V_T/V_L)^2}{2 - 2(V_T/V_L)^2}$$

where $V_L$ is the velocity of longitudinal waves, and
$V_T$ is the velocity of shear waves.

Thus, in order to determine Young's modulus by conventional or former methods, a shear wave crystal must be cemented to the material, or a probe used which generates a shear wave through mode conversion at a surface of the material. Additionally, a probe suitable for generating longitudinal waves must be coupled to the test material.

It is, therefore, a primary object of the present invention to provide an ultrasonic transmission probe whereby transducer generated shear waves may be applied directly to the material to be tested without any intermediate couplant.

It is another object of the present invention to provide an ultrasonic transmission probe in which both longitudinal and shear ultrasonic waves may be generated and applied to a test material.

It is yet another object of the present invention to provide an ultrasonic transmission probe in which a single crystal may be used to generate shear waves at one contact surface and longitudinal waves at an independent contact surface of the probe.

Other objects and advantages will become apparent from the following detailed description when taken in conjunction with the following drawing in which.

Figure 1:
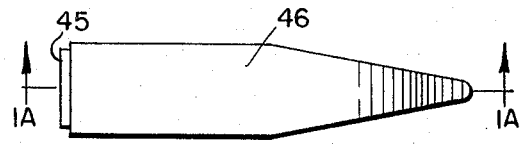
FIG. 1 is an illustration in side (or profile) view of an ultrasonic transmission probe constructed in accordance with the principles of this invention.
Figure 1A:
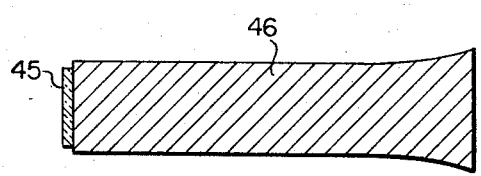
FIG. 1A is a cross-sectional view of the probe element of FIG. 1 taken along the line A—A of FIG. 1.
Figure 2:
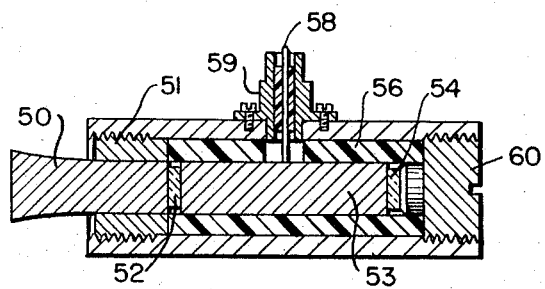
FIG. 2 is an illustration in vertical cross-section of a probe element suitable for generating both shear and longitudinal ultrasonic waves.

With reference now specifically to FIGS. 1 and 2, a probe element is illustrated which is suitable for generating and transmitting either longitudinal or shear waves to a test material. It has been found that if a transmitting probe is pressed against the face of the material to be tested with sufficient force, efficient transmission of shear waves is obtained. For instance, if a shear wave generating piezoelectric crystal 45 is bonded to one end of a generally chisel-shaped contact element 46 sufficiently high pressure contact may be established between the narrow edge of the chisel and the test material to transmit shear waves which can be measured with conventional ultrasonic detection equipment. The pressures required are generally in the order of 1,000 to 10,000 lbs. per square inch. Thus, a suitable dimension for the radius of the sharp edge of the chisel-shaped contact probe illustrated in FIGS. 1 and 2 is 1/8″. While for the same applied force, greater pressure at the contact edge may be obtained with a smaller contact area, the decreased surface of contact increases beam spreading, which decreases the amplitude of the ultrasonic waves, as it progresses in the material and hence requires an increased efficiency in the detector. Other configurations of contacting surfaces for the probe may also be suitable. Thus, a conical-shaped probe and a spherical probe have both been employed with effective results.

In FIGS. 2 through 6 are illustrated a series of ultrasonic transmission probes employing a pair of crystals to either alternately or simultaneously generate longitudinal and shear ultrasonic waves. In the probes illustrated in FIGS. 2 and 3 waves of both modes are transmitted through the same contact surface to the test material, while in the probes illustrated in FIGS. 4 and 5 waves of one mode are coupled to the test material through different contacting surfaces.

Turning now specifically to the probe of FIG. 2, a buffer contact rod 50 having a chisel contact edge has threaded to it a metal sleeve 51. At the opposite end of the rod element 50 from the chisel edge is mounted a piezoelectric crystal 52 adapted, when excited by appropriate electrical signals, to emit longitudinal ultrasonic waves. Fixed to the back face of crystal 52 is an electrically and acoustically conducting cylindrical rod element 53 which extends within the center section of sleeve 51 in axial alignment with the long axis of sleeve 51. At the opposite end of the cylindrical conductor 53 is cemented a second piezoelectric crystal 54 and this second crystal is specifically adapted to generate ultrasonic shear waves. A sleeve 56 formed of highly insulating material such as Teflon surrounds the cylindrical conducting element 53 with the exception of an opening which allows a conducting spring element 58 from a feedthrough connector 59 to contact the cylindrical conductor 53. Mounted in the opposite end of the sleeve 51 from the chisel probe 50 is an electrically conducting retaining plug element 60 which threads within the sleeve in order to retain the series of elements including the two piezoelectric crystals 52 and 54 and the cylindrical conductor 53 in close juxtaposition. Additionally, since both end surfaces of both piezoelectric crystals 52 and 54 are conducting, then the chisel element 50, the sleeve 51, the retaining plug 60, and one surface of each of the piezoelectric crystals 52 and 54 are at a common electrical potential.

The feedthrough connector 59 allows an electrical connection from spring 58 to be made to the other end surface of each of the crystals 52 and 54. With this probe element, when appropriate electrical energy is applied to spring 58, both the longitudinal emitting crystal 52 and the shear wave emitting crystal 54 are excited simultaneously. Since the shear waves travel through a given material at one-half of the transmission rate of the longitudinal wave through the same material, there will be a time difference of arrival of each of the generated waves at the chisel end, and hence at the test specimen. In a typical instance, the chisel element might be 2″ long and the cylindrical conductor 53 also 2″ long. In steel or aluminum at room temperature the longitudinal waves travel at aproximately ¼″ per microsecond while the shear waves travel at ⅛″ per microsecond, hence the longitudinal wave would appear at the chisel edge approximately eight microseconds after excitation, while the shear wave would not appear at the same point until thirty-two microseconds after excitation. Using this type of arrangement then the signals from a receiving probe can readily be ascribed to the proper mode of exciting ultrasonic energy.

The probe may, however, be constructed in the opposite fashion, that is, with the shear wave crystal cemented directly to the chisel-shaped contact element and with the longitudinal wave crystal mounted at the further end of the cylindrical conductor. Under these circumstances both the shear and longitudinal waves would arrive at the chisel edge at the same instant after excitation. Separation of these signals after transmission through a test specimen could then be done on the basis of the difference in transmission time through the test specimen, since the longitudinal waves would travel at substantially twice the velocity of the shear waves through a given specimen. Longitudinal and shear waves can also be separated by electrical filtering, if their frequencies are not equal.

Figure 3:
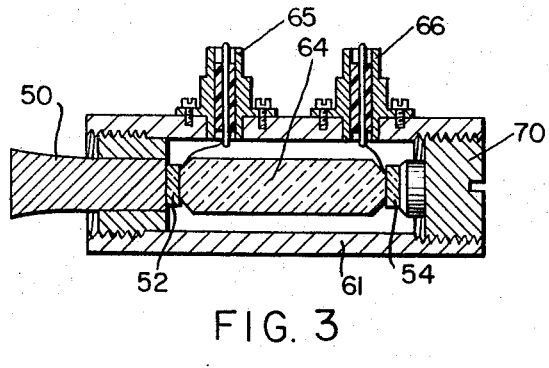
FIG. 3 is an ilustration in vertical cross-sectional view of a second embodiment of a probe element constructed in accordance with the principles of this invention and suitable for generating both shear and ultrasonic waves.

Turning now to FIG. 3, a second embodiment of a contact probe providing for the application of both shear and longitudinal ultrasonic waves is shown. In the apparatus illustrated in FIG. 3 a chisel-shaped contact element 50 is mounted in a metallic sleeve element 61 and a first piezoelectric crystal 52 adapted to emit chiefly longitudinal ultrasonic waves and a second piezoelectric crystal 54 adapted chiefly to emit shear waves are mounted within the sleeve 61. However, in this instance, the crystals are cemented to opposite ends of a generally cylindrical insulating rod 64, which has slightly beveled edges at either end in order to permit independent electrical connection to the inner faces of the crystals 52 and 54 by means of connecting wires from a pair of feedthrough connectors 65 and 66. A retaining plug 70 is mounted in the end of sleeve 61 in order to maintain the elements in close physical juxtaposition and also to provide an electrical contact from the outer face of crystal 54 through sleeve 61 to the chisel probe and the outer face of crystal 52. In this arrangement the cylindrical material 64 is an electrically insulating material which is suitable for the transmission of ultrasonic waves, for example, fused silica or acrylic resin. A probe of the type described and illustrated with reference to FIG. 3 can therefore be operated either to produce only shear waves, only longitudinal waves or alternately shear and longitudinal waves. Thus, a pulse generator may be used which can switch the electrical signals to either one of the two input connections 65 and 66 or which can be programmed to alternately connect electrical energy to one and the other in a specific time sequence.

In FIGS. 2 and 3, the buffer rods 53 and 64, respectively, are shown as extended rods. It will be understood that their actual length can be adjusted from nearly zero to any practical maximum.

In the device illustrated in FIG. 2 the shortening of buffer 53 to the order of one thousandth of an inch long, i.e., to an electrode thickness, requires no changes in the electrical connections. In the device of FIG. 3, however, where the object is to separately generate either longitudinal or shear waves, it will be seen that when buffer 64 is shortened to a thin membrane, it will still be desirable to be able to apply an electric field across either crystal separately. One means of accomplishing this is to connect the adjoining electrode surfaces between the two adjacent crystals to the exciting voltage, and to connect either one or the other of the non-adjacent crystal surfaces to ground, depending on which crystal it is desired to energize. Switching of the ground connection from the longitudinal to the shear crystal can of course be accomplished manually, mechanically or electronically by conventional electronic switching circuits. The non-adjacent crystal surfaces must be electrically isolated within the probe for the crystals to be excited separately. Accordingly, sleeve 61 would then be an electrically insulating material such as Teflon or nylon or acrylic resin. Alternatively, the chisel 50 and retaining plug 70 may be of an electrically insulating material.

In FIGS. 2 and 3, the buffer and contact elements have been shown in their simplest forms. In practice, in order to reduce multiple specular reflections within the probe, the buffer and contact elements would normally be threaded or knurled on their outer surface. Another technique which may be used to reduce reflections is to imbed the contact element or buffer within an outer coating of a highly attenuating material. These and similar reflection inhibiting techniques are however well known in the ultrasonic transducer art.

Figure 4:
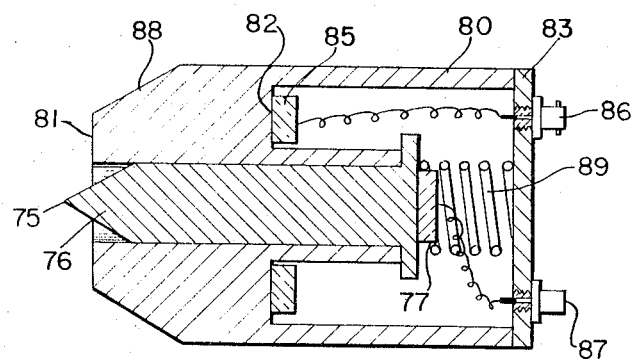
FIG. 4 is a vertical cross-sectional view of a third embodiment of a probe element constructed in accordance with the principles of this invention and suitable for generating shear and longitudinal ultrasonic waves.
Figure 4A:
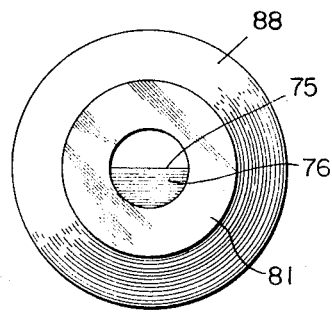
FIG. 4A is an end view of the probe of FIG. 4.

Turning now to FIGS. 4 and 4A a probe element is shown in which a chisel edge 75 of a shear contacting element 76, spring loaded by the spring 89, provides the actual contact surface for transmitting shear waves generated at a shear wave exciting crystal 77, which is bonded to the butt end of the chisel element 76. Surrounding the shear contact element 76 and generally coaxial with it is a cylindrical shell 80 having an annular contact surface 81 for transmitting longitudinal waves to the test material. The cylindrical shell 80 has a hollowed-out generally cup-shaped section 82 at the opposite end from the contact surface 81. This shell has a generally thickened solid portion between the annular contact surface 81 and the bottom of the cup-shaped opening 82. Mounted within the cup-shaped opening and contacting this thickened portion is an annular longitudinal wave generating crystal 85. The cup-shaped opening of the shell 80 is closed by a plate 83 in which are mounted a pair of electrical connectors 86 and 87. Connector 86 provides an electrical connection to the longitudinal wave generator crystal 85 while connector 87 provides for an electrical connection to the shear wave generating crystal 77. Thus, by applying suitable exciting signals either simultaneously or in any prearranged sequence to the connectors 86 and 87 both shear waves and longitudinal waves may be generated and applied to the test material. Using a probe of the type shown in FIG. 4 provides that longitudinal waves may be coupled through a large surface area, thus improving the efficiency of coupling for them while at the same time the shear waves are coupled through the chisel edge contact thus providing for the high pressure for efficient coupling of shear waves.

It should also be noted that in the probe element in FIG. 4 the coaxial cylindrical shell is beveled so that the annular contact surface for the longitudinal wave transmission has a smaller outer diameter than the diameter of the shell itself. The resultant beveled surface 88 may, if desired, be utilized to transmit or receive.

Figure 5:
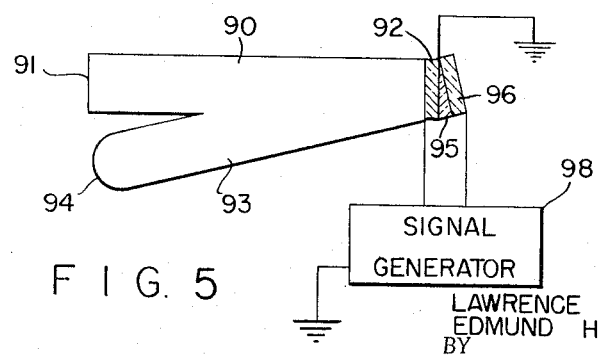
FIG. 5 is a perspective view of still another transmission (or receiving) probe constructed in accordance with the principles of this invention.

FIG. 5 illustrates still another embodiment of a probe adapted to provide both longitudinal and shear waves, again with independent contact surfaces for transmitting longitudinal waves and the shear waves. The probe has a bifurcated form with the contact surface for longitudinal waves being independent of the contact surface for shear waves. In this instance, the probe element has a generally cylindrical portion 90 with one end 91 of the cylinder 90 forming the contact area for transmission of the longitudinal waves and the opposite end of that cylindrical portion 90 having bonded to it a longitudinal wave generating crystal 92. The shear wave portion of this probe is another generally cylindrical element 93 having a hemispherical end 94 serving as the shear wave contacting surface and with the other end of this cylinder 93 being merged into the first cylindrical portion 90 at a relatively acute angle. A thin wedge 95 of acoustically conducting material is bonded to the back face of the longitudinal wave generating crystal 92 and this wedge 95 has in turn adhered to it a shear wave generating crystal 96. The angle of the wedge 95 is such with respect to the joining angle between the cylinders 90 and 93 that shear waves generated in crystal 96 are transmitted down the shear wave contact portion 93 of the probe while longitudinal waves are transmitted down the longitudinal wave contact portion 90. The adjacent faces of each of the crystals are electrically connected together and in turn are connected to a common point in a signal generator 98. The non-adjacent faces of each of the crystals are then electrically connected to independent contacts of the signal generator 98. The signal generator 98 may be arranged to excite both crystals simultaneously or either crystal preferentially or both crystals in a predetermined time sequence.

Figure 6:
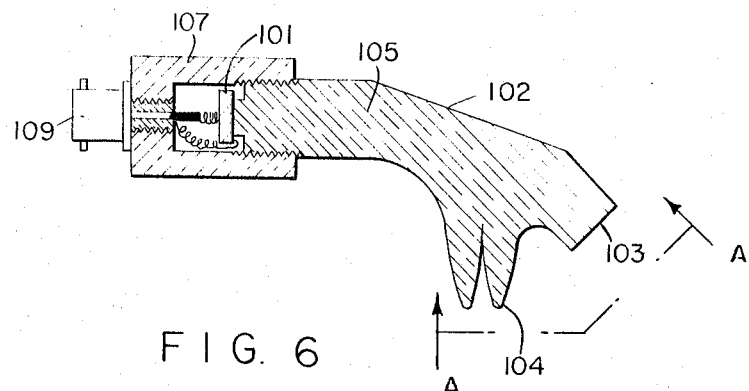
FIG. 6 is a vertical cross-sectional view of an ultrasonic transmission probe constructed in accordance with the principles of this invention wherein a single crystal is utilized to generate both shear, longitudinal, Rayleigh and plate waves.
Figure 6A:
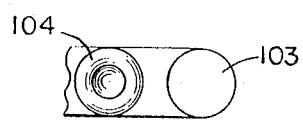
FIG. 6A is a view of the probe of FIG. 6 taken along the line A—A of FIG. 6.

In FIGS. 6 and 6A there is illustrated an ultrasonic transmission probe employing a single exciting crystal 101 to generate in a generally bifurcated contact element 105 four different kinds of waves for transmission. Crystal 101 may be either a shear or longitudinal crystal, bonded to the contact probe 105. A small cylindrical housing 107 is mounted on the contact probe 105 and in turn has mounted to it a coaxial electrical connector 109 which provides for electrical connection to the piezoelectric crystal 101.

This probe utilizes the principle of mode conversion to generate both shear and longitudinal waves within the solid probe itself with a single crystal. Three different contact faces are provided on the element 105. One contact face 102 lies at an oblique angle with respect to the axis of propagation of the waves generated by the crystal 101. When the crystal 101 is excited, ultrasonic waves are transmitted into the contact element 105 and are obliquely incident upon the angled face 102. In general two waves are reflected. Longitudinal reflected waves travel along one section of the probe 105 and strike the flat end face 103 at normal incidence. This face 103 provides the contact surface for longitudinal waves. On the other hand, shear waves reflected from the face 102 travel in a different direction and are channeled to the annular contact surface 104. The annular form of contact surface 104 allows the high pressure contact needed for efficient transmission of shear waves, and also aligns the shear wave contact portion in a reproducible manner against the material under test. If the angled face 102 is placed against an extended body in which the surface or Rayleigh wave velocity exceeds the incident velocity, then Rayleigh waves may be generated in that body. On the other hand, if the face 102 is placed against the surface of a thin plate whose thickness is comparable to the wavelength, then for certain combinations of plate thickness, test frequency and angle of incidence, plate waves will be generated. Thus, the transmission probe illustrated in FIG. 6 has three independent surfaces for coupling either Rayleigh waves, plate waves, longitudinal waves, or shear waves to a test material.

The invention having been disclosed, various modifications and improvements will now occur to those skilled in the art and the invention should be construed as limited only by the spirit and scope of the appended claims:

What is claimed is:

1. An ultrasonic wave transmission probe comprising, a piezoelectric crystal for emitting ultrasonic waves along an axis of propagation normal to the face of said crystal; an elongated contact element bonded to said crystal and having a longitudinal axis coincident with the axis of propagation of said emitted ultrasonic waves, said contact element having a contact surface in a plane normal to said axis of propagation, said contact surface having an area substantially less than the area of said crystal face, and a radius of curvature greater than one eighth inch.

2. Apparatus in accordance with claim 1 wherein said contact element terminates at the opposite end from said crystal in a wedge-shape, the narrow edge of said wedge forming said contact area.

3. An ultrasonic transmitting probe comprising, first and second piezoelectric crystals, each crystal having first and second opposed surfaces, one of said crystals producing, upon excitation, ultrasonic waves substantially in the longitudinal mode and the other of said crystals producing, upon excitation, ultrasonic waves substantially in the shear mode; a contact element, said first crystal having the first of its opposed surfaces bonded to a surface of said contact element; a coupling member, said second crystal having the first of its opposed surfaces bonded to one end of said coupling member, said other end of said coupling member being bonded to the second of said opposed surfaces of said first crystal, said contact element being formed with a contact surface in a plane normal to the direction of propagation of ultrasonic waves emitted from said first and said second crystals, the area of said contact surface being substantially less than the area of said first crystal surface bonded to said contact element, said contact surface having a surface of curvature greater than one eighth inch.

4. Apparatus in accordance with claim 3 wherein the length of said coupling member is equal to the length of said contact element between said contact area and said first crystal surface bonded to said contact element.

5. Apparatus in accordance with claim 3 wherein said opposed surfaces of said first and second crystals are electrically conducting and wherein said coupling member is electrically conducting and further including means for electrically connecting said first surface of said first crystal to said second surface of said second crystal and an electrical connector connecting to said coupling member.

6. Apparatus in accordance with claim 3 wherein said coupling member is acoustically conducting but electrically insulating and wherein said opposed surfaces of said crystals are electrically conducting and further including means for electrically connecting said first surface of said first crystal to said second surface of said second crystal and first and second electrical connectors, said first electrical connector being connected to said second surface of said first crystal and said second electrical connector being connected to said first surface of said second crystal.

7. An ultrasonic transmitting probe comprising, first and second piezoelectric crystals, each of said crystals having first and second opposed surfaces, said first crystal producing, upon excitation, ultrasonic waves substantially in the longitudinal mode and emitting said waves along an axis of propagation normal to said first and second surfaces, said second piezoelectric crystal producing, upon excitation, ultrasonic waves substantially in the shear mode and emitting said waves along an axis of propagation normal to said first and second surfaces of said second crystal; a contact element including two extending portions joined at a fixed angle to form a common portion of said contact element, said first surface of said first crystal being bonded to said common portion at an angle such that the axis of propagation of the ultrasonic waves emitted by said first crystal is coincident with the longitudinal axis of one of said extending portions; an acoustical coupling element bonded to said second surface of said first crystal, said first surface of said second crystal being bonded to said coupling element, said coupling element being formed such that the angle between the said first surface of said first crystal and the first surface of said second crystal is substantially equal to said fixed angle between said extending portions of said contact element, one of said extending portions being formed with a contact area normal to the axis of propagation of the ultrasonic waves transmitted longitudinally along said extended portion, said contact area being substantially less than the area of said first surface of said first crystal, said contact area having a radius of curvature greater than one eighth inch.

8. An ultrasonic wave transmitting probe comprising, a first contact element of generally cylindrical configuration, a first piezoelectric crystal having first and second opposed surfaces, said first piezoelectric crystal emitting ultrasonic waves substantially in the shear mode along an axis of propagation normal to the plane of said first and second surfaces, said first surface of said first crystal being bonded to one end of said first contact element, the opposite end of said first contact element being formed in a wedge-shape, the narrow edge of said wedge having a radius of curvature greater than one eighth inch; a second contact element formed generally as a cylinder with a hollowed center portion, said second contact element being mounted coaxial with and concentric about said first contact element; a second crystal having first and second opposed surfaces, said second crystal emitting ultrasonic waves substantially in the longitudinal mode along an axis of propagation normal to said first and second surfaces, said second crystal having a generally annular form, said first surface of said second crystal being bonded to one end of said second contact element, the other end of said second contact element being positioned to lie approximately in the plane of said first contact element contact area.

9. An ultrasonic wave transmitting probe comprising, a piezoelectric crystal having first and second opposed surfaces, said piezoelectric crystal emitting ultrasonic waves along an axis of propagation normal to said first and said second surfaces; a contact element having a common portion and first and second extending portions extending from said common portion, said common portion having a reflecting surface intersecting said axis of propagation of ultrasonic waves emitted from said piezoelectric crystal, said reflecting surface being disposed at such an angle with respect to the axis of propagation of said waves and with respect to the longitudinal axes of said first and second extending portions that waves reflected from said reflecting surface along the longitudinal axis of said first extending portion are substantially in the shear mode and waves reflected from said reflecting surface along the longitudinal axis of said second extending portion are substantially in the longitudinal mode, said first extending portion of said contact element having a contact surface in a plane normal to the axis of propagation of said shear wave along said first extending portion, said contact surface having a radius of curvature greater than one eighth inch, said contact surface being substantially less in area than said first surface of said piezoelectric crystal.

References Cited by the Examiner
UNITED STATES PATENTS

| | | | |
|---|---|---|---|
| 2,834,158 | 5/1958 | Petermann | 310—8.2 |
| 2,972,069 | 2/1961 | Sproule | 310—8.3 |

MILTON O. HIRSHFIELD, *Primary Examiner.*

J. D. MILLER, *Assistant Examiner.*